US010996998B2

(12) United States Patent
Kasahara

(10) Patent No.: US 10,996,998 B2
(45) Date of Patent: May 4, 2021

(54) INFORMATION PROCESSING APPARATUS AND CONTROL METHOD THEREOF

(71) Applicant: CANON KABUSHIKI KAISHA, Tokyo (JP)

(72) Inventor: Kimito Kasahara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/154,937

(22) Filed: Oct. 9, 2018

(65) Prior Publication Data
US 2019/0108070 A1 Apr. 11, 2019

(30) Foreign Application Priority Data
Oct. 10, 2017 (JP) .............................. JP2017-197058

(51) Int. Cl.
G06F 9/54 (2006.01)
G06F 9/50 (2006.01)
G06F 11/07 (2006.01)
G06F 9/455 (2018.01)
G06F 9/448 (2018.01)
G06F 9/445 (2018.01)

(52) U.S. Cl.
CPC ............ G06F 9/541 (2013.01); G06F 9/4484 (2018.02); G06F 9/45504 (2013.01); G06F 9/5016 (2013.01); G06F 9/542 (2013.01); G06F 11/0706 (2013.01); G06F 9/44526 (2013.01)

(58) Field of Classification Search
CPC .... G06F 9/541; G06F 9/5016; G06F 11/0706; G06F 9/4484; G06F 9/45504; G06F 9/542; G06F 9/44526
See application file for complete search history.

(56) References Cited

U.S. PATENT DOCUMENTS 6,553,428 B1 4/2003 Ruehle
8,305,601 B2 * 11/2012 Kawai .................. G06F 3/1204
358/1.15

(Continued)

FOREIGN PATENT DOCUMENTS

CN 1731350 A 2/2006
CN 1898645 A 1/2007
(Continued)

OTHER PUBLICATIONS

European Search Report issued in correspondning European Application No. 18196335.6 dated Mar. 13, 2019.
(Continued)

Primary Examiner — Charles E Anya
(74) Attorney, Agent, or Firm — Venable LLP

(57) ABSTRACT

A native client transmits, in accordance with a request from an image processing plugin application executed in a Java execution environment, a processing request for requesting execution of image processing using a native module executed in a C/C++ execution environment. A native server receives the processing request transmitted from the native client and executes the image processing by executing the native module in accordance with the received processing request. The native server is operated on a native control process that uses a memory space independent of a memory space used in the Java execution environment.

10 Claims, 6 Drawing Sheets

(56) References Cited

U.S. PATENT DOCUMENTS

| | | | |
|---|---|---|---|
| 2001/0052006 A1* | 12/2001 | Barker | H04L 41/0213 709/223 |
| 2003/0055890 A1* | 3/2003 | Senda | H04N 1/00206 709/203 |
| 2005/0179936 A1* | 8/2005 | Sedky | G06F 3/1288 358/1.15 |
| 2006/0047824 A1* | 3/2006 | Bowler | H04L 67/02 709/229 |
| 2007/0240124 A1 | 10/2007 | Taneda et al. | |
| 2008/0055667 A1* | 3/2008 | Baba | H04N 1/0035 358/448 |
| 2014/0043636 A1 | 2/2014 | Akatsu | |
| 2015/0178030 A1 | 6/2015 | Kasahara | |
| 2015/0363144 A1 | 12/2015 | Suzuki | |
| 2017/0289293 A1* | 10/2017 | Rubtsov | H04L 67/2823 |

FOREIGN PATENT DOCUMENTS

| | | |
|---|---|---|
| JP | 2013178606 A | 9/2013 |
| WO | 2006120280 A1 | 11/2006 |

OTHER PUBLICATIONS

Chinese Office Action issued in corresponding Chinese Application No. 201811176371.X dated Oct. 9, 2019.

\* cited by examiner

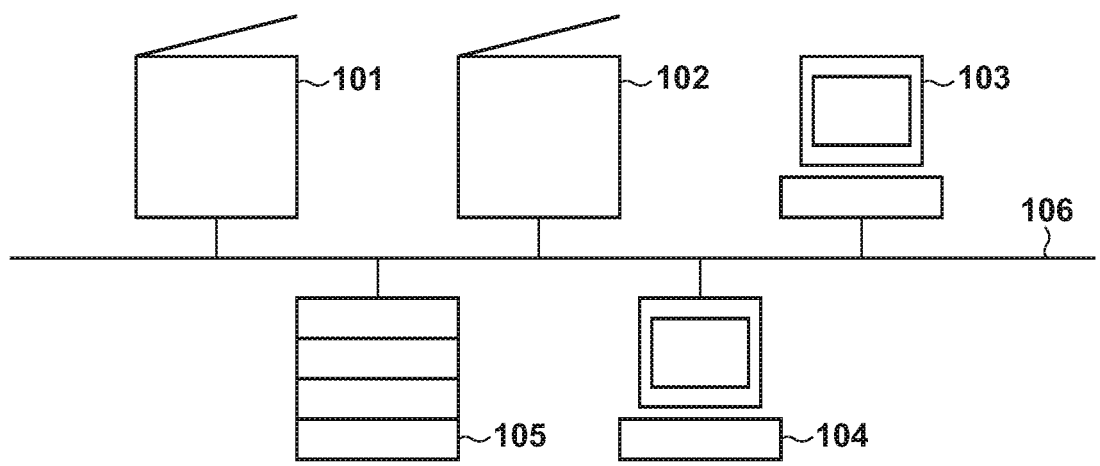
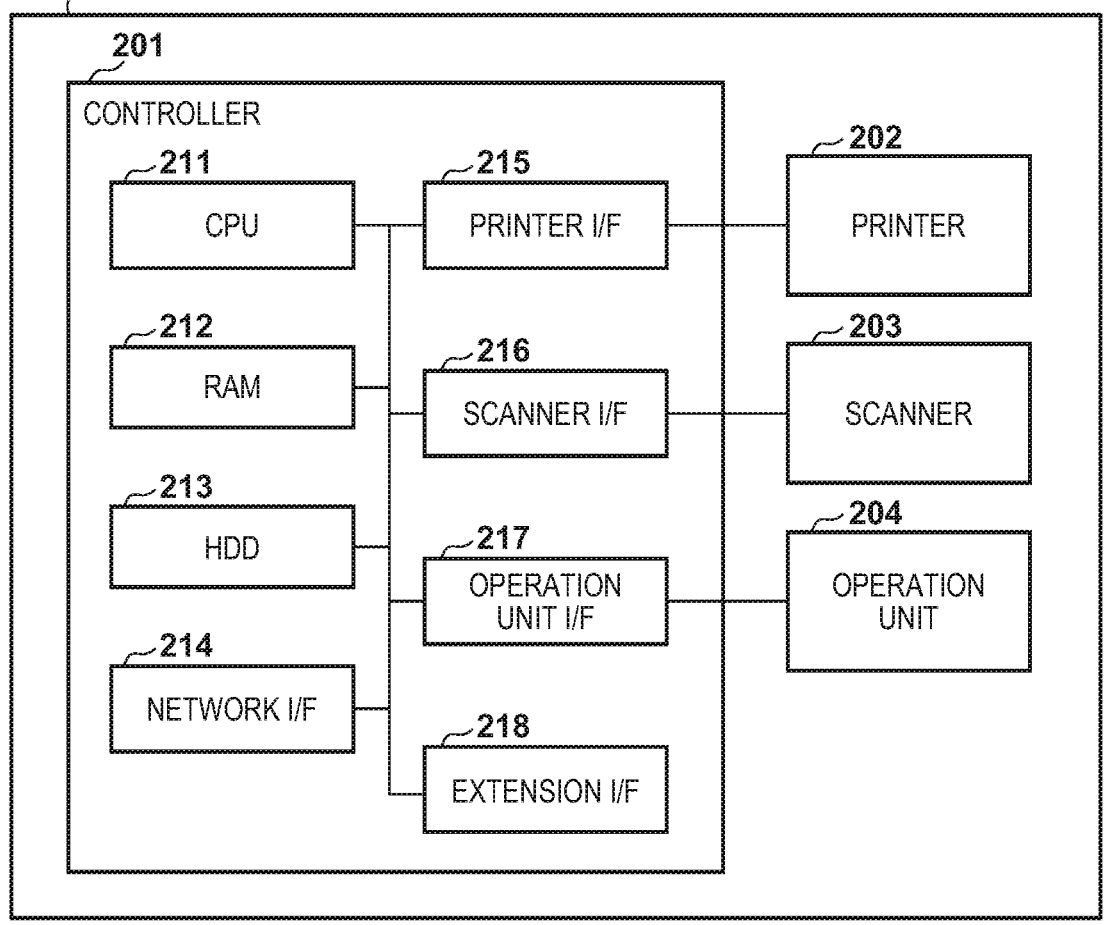

INFORMATION PROCESSING APPARATUS AND CONTROL METHOD THEREOF

BACKGROUND OF THE INVENTION

Field of the Invention

The present invention relates to an information processing apparatus and a control method thereof.

Description of the Related Art

When developing software for executing information processing, a programming language (for example, a Java® language) having an importance on developing efficiency and a program language (for example, a C language or C++ language) having an importance on the processing speed are often used together. For example, the programming language having an importance on developing efficiency is used for development of a frequently updated program (for example, an application program). On the other hand, the programming language having an importance on the processing speed is used for development of a program (for example, an image processing program) for performing a complicated arithmetic operation. This can realize an arrangement in which a program for performing the complicated arithmetic operation can be operated at high speed while improving the developing efficiency of the frequently updated program. When a language having a function for automating memory management (a function of automatically performing management of a memory area used in a program) like the Java language is used as the program language having an importance on developing efficiency, installation can be performed with a light load and the developing efficiency can further be improved.

As a technique for using different programming languages together as described above, Japanese Patent Laid-Open No. 2013-178606 discloses a technique for using a graphical programming language and text format programming language such as a C language together in a software developing environment of an embedded system. In Japanese Patent Laid-Open No. 2013-178606, an execution program developed in one programming language and an execution program developed in the other programming language are operated in the same execution environment, thereby allowing calling between the execution programs.

In a general calling mechanism which allows calling between different programming languages, however, the calling program and the called program share a logical memory space. If sharing of the logical memory space occurs, an error in the memory operation by the called program can influence the operation of the calling program.

The above error in the memory operation can occur in a program developed in a program language having no function for automating memory management. For example, an image processing program developed in the programming language having no function for automating memory management is called from an application program (application) and an error may occur in a memory operation by this image processing program. When the memory area used by the application is influenced by the error of the memory operation, an abnormality occurs in the operation of this application. For example, an abnormality such as erasure of customer data managed by the application and an accidental end of print processing controlled by the application occurs. A problem is posed in the operation of an apparatus itself in which the application is installed.

SUMMARY OF THE INVENTION

The present invention has been made in consideration of the above problem. The present invention provides a technique for preventing an influence of an error of a memory operation by one program on the operation of another program, between programs developed in different programming languages.

According to one aspect of the present invention, there is provided an information processing apparatus comprising: a client configured to transmit, in accordance with a request from a first program executed in a first execution environment corresponding to a first programming language, a processing request for requesting execution of information processing using a second program executed in a second execution environment corresponding to a second programming language, the client being operated in the first execution environment; and a server configured to receive the processing request transmitted from the client and execute the information processing by executing the second program in accordance with the received processing request, the server being operated in the second execution environment, wherein the server operates on a process that uses a memory space independent of a memory space used in the first execution environment.

According to another aspect of the present invention, there is provided a method of controlling an information processing apparatus, the method comprising: operating a client in a first execution environment so as to transmit, in accordance with a request from a first program executed in the first execution environment corresponding to a first programming language, a processing request for requesting execution of information processing using a second program executed in a second execution environment corresponding to a second programming language; and operating a server in the second execution environment so as to receive the processing request transmitted from the client and execute the information processing by executing the second program in accordance with the received processing request, wherein the server operates on a process that uses a memory space independent of a memory space used in the first execution environment.

According to the present invention, the influence of the error of the memory operation by one program on the operation of another program can be prevented between the programs developed in different programming languages.

Further features of the present invention will become apparent from the following description of exemplary embodiments (with reference to the attached drawings).

BRIEF DESCRIPTION OF THE DRAWINGS

FIG. 1 shows an arrangement example of an image forming system;

FIG. 2 is a block diagram showing a hardware arrangement example of an image forming apparatus;

DESCRIPTION OF THE EMBODIMENTS

Figure 3:
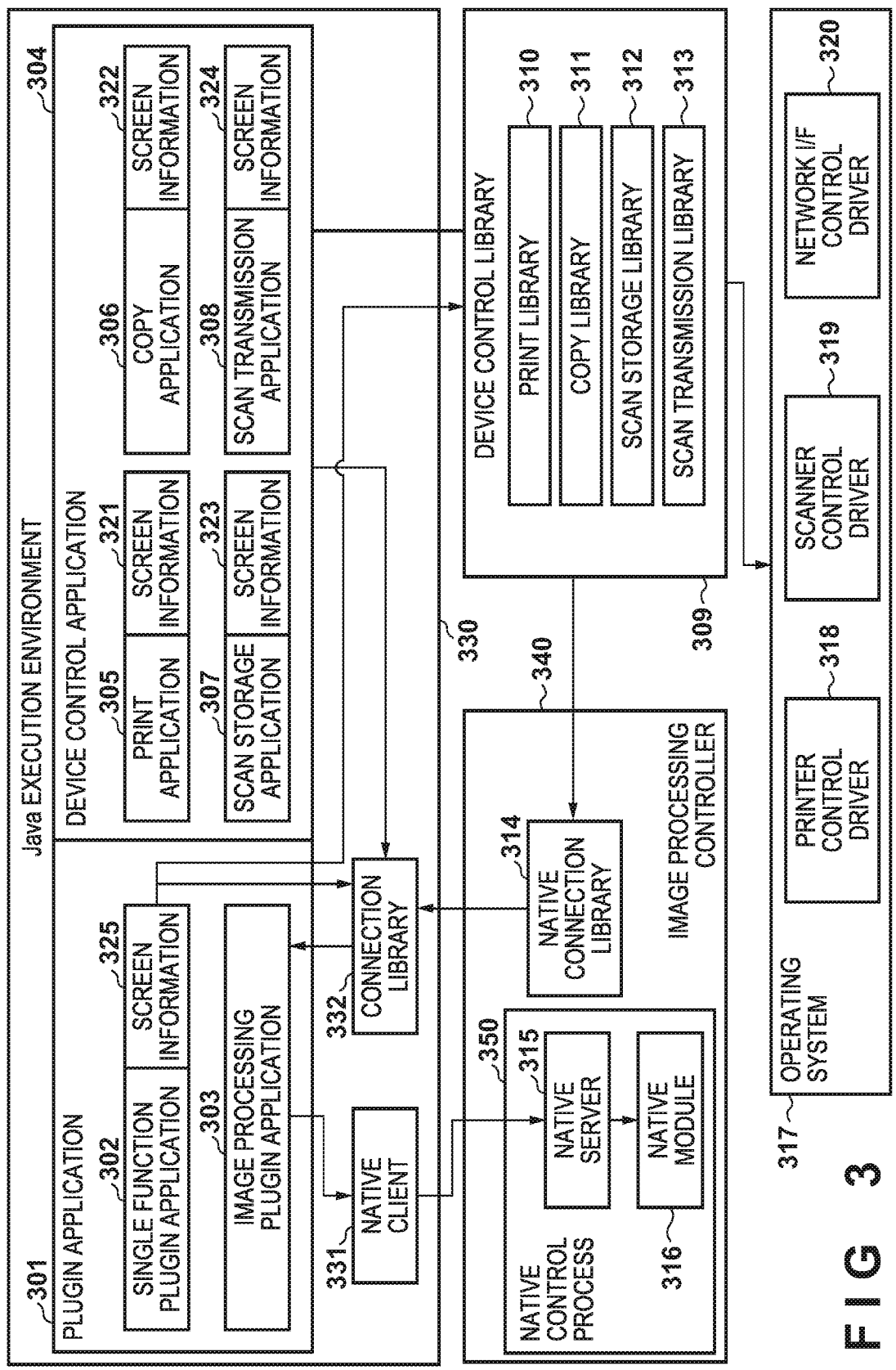
FIG. 3 is a block diagram showing a software arrangement example of the image forming apparatus.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Examples in which the present invention is applied to an image forming apparatus will be described in the following first to fourth embodiments. Note that the present invention is applicable to any apparatus if it is an information processing apparatus. The present invention is applicable not only to an image forming apparatus such as a printing apparatus, a copying machine, a multifunction peripheral, or a facsimile apparatus, but also to an information processing terminal such as a PC, a portable telephone, or a smartphone.

First Embodiment

<Image Forming System>

First, the first embodiment will be described below. FIG. 1 shows an arrangement example of an image forming system according to this embodiment. The image forming system includes image forming apparatuses 101 and 102, information processing terminals 103 and 104, and a server 105. The image forming apparatuses 101 and 102, the information processing terminals 103 and 104, and the server 105 are connected to and communicated with each other via a network 106. The network 106 is a network such as a LAN (Local Area Network) or the Internet through which the apparatuses in the image forming system can communicate with each other.

FIG. 1 illustrates an example in which the two image forming apparatuses 101 and 102 are arranged. However, an arbitrary number of (one or more) image forming apparatuses can be arranged in the image forming system. In this embodiment, the image forming apparatuses 101 and 102 are MFPs (Multifunction Peripherals), but can be any one of, for example, an MFP, a printing apparatus, a copying machine, and a facsimile apparatus. In the following description, it is assumed that the image forming apparatuses 101 and 102 have the same arrangement, and a detailed description of the image forming apparatus 102 will be omitted.

The image forming apparatus 101 includes a printer and a scanner, and can, for example, receive a print request (print data) from the information processing terminals 103 and 104 and cause the printer to perform printing. The image forming apparatus 101 can also cause the scanner to read an original image to generate image data. The image forming apparatus 101 can cause the printer to perform printing based on the image data generated by the scanner and can store print data received from the information processing terminals 103 and 104. In addition, the image forming apparatus 101 can perform transmission of the image data generated by the scanner to the information processing terminals 103 and 104, image processing using the server 105, and printing of a document stored in the server 105. The image forming apparatus 101 further provides various kinds of services using the printer and scanner, and can be arranged such that a new service (function) can be added. More specifically, the addition of the new service can be realized by installing an additional plugin application in the image forming apparatus 101.

<Hardware Arrangement of Image Forming Apparatus>

FIG. 2 is a block diagram showing a hardware arrangement example of the image forming apparatus 101 according to this embodiment. The image forming apparatus 101 includes a controller 201, a printer 202, a scanner 203, and an operation unit 204. The controller 201 includes a CPU 211, a RAM 212, an HDD 213, a network interface (I/F) 214, a printer I/F 215, a scanner I/F 216, an operation unit I/F 217, and an extension I/F 218. The CPU 211 can exchange data with the RAM 212, the HDD 213, the network I/F 214, the printer I/F 215, the scanner I/F 216, the operation unit I/F 217, and the extension I/F 218. In addition, the CPU 211 loads a program (instruction) read out from the HDD 213 into the RAM 212 and executes the program loaded into the RAM 212.

Programs executable by the CPU 211, setting values used in the image forming apparatus 101, data associated with processing requested from a user, and the like can be stored in the HDD 213. The RAM 212 is used to temporarily store a program read out from the HDD 213 by the CPU 211. The RAM 212 is used to store various kinds of data necessary for executing the program. The network I/F 214 is an interface for communicating with other apparatuses in the image forming system via the network 106. The network I/F 214 can notify the CPU 211 of reception of data and transmit the data on the RAM 212 to the network 106.

The printer I/F 215 can transmit print data received from the CPU 211 to the printer 202 and notify the CPU 211 of the state of the printer 202 notified from the printer 202. The scanner I/F 216 can transmit, to the scanner 203, an image reading instruction received from the CPU 211 and transmit, to the CPU 211, the image data received from the scanner 203. The scanner I/F 216 can notify the CPU 211 of the state of the scanner 203 notified from the scanner 203.

The operation unit I/F 217 can notify the CPU 211 of an instruction input on the operation unit 204 by the user and transmit, to the operation unit 204, screen information of an operation screen which accepts a user operation. The extension I/F 218 is an interface capable of connecting an external device to the image forming apparatus 101. The extension I/F 218 is an interface having a USB (Universal Serial Bus) format, for example. If an external storage device such as a USB memory is connected to the extension I/F 218, the image forming apparatus 101 can read out the data stored in the external storage device and write the data to the external storage device.

The printer 202 can print, on a sheet, an image corresponding to the image data received from the printer I/F 215 and notify the printer I/F 215 of the state of the printer 202. The scanner 203 can read an original image in accordance with an image reading instruction received from the scanner I/F 216 to generate image data, and transmit the generated image data to the scanner I/F 216. In addition, the scanner 203 can notify the scanner I/F 216 of the state of the scanner 203. The operation unit 204 is an interface for allowing the user to perform an operation for sending various kinds of instructions to the image forming apparatus 101. For example, the operation unit 204 includes a display unit having a touch panel function, provides an operation screen to the user, and accepts an operation from the user via the operation screen.

<Image Processing System of Image Forming Apparatus>

Figure 7:
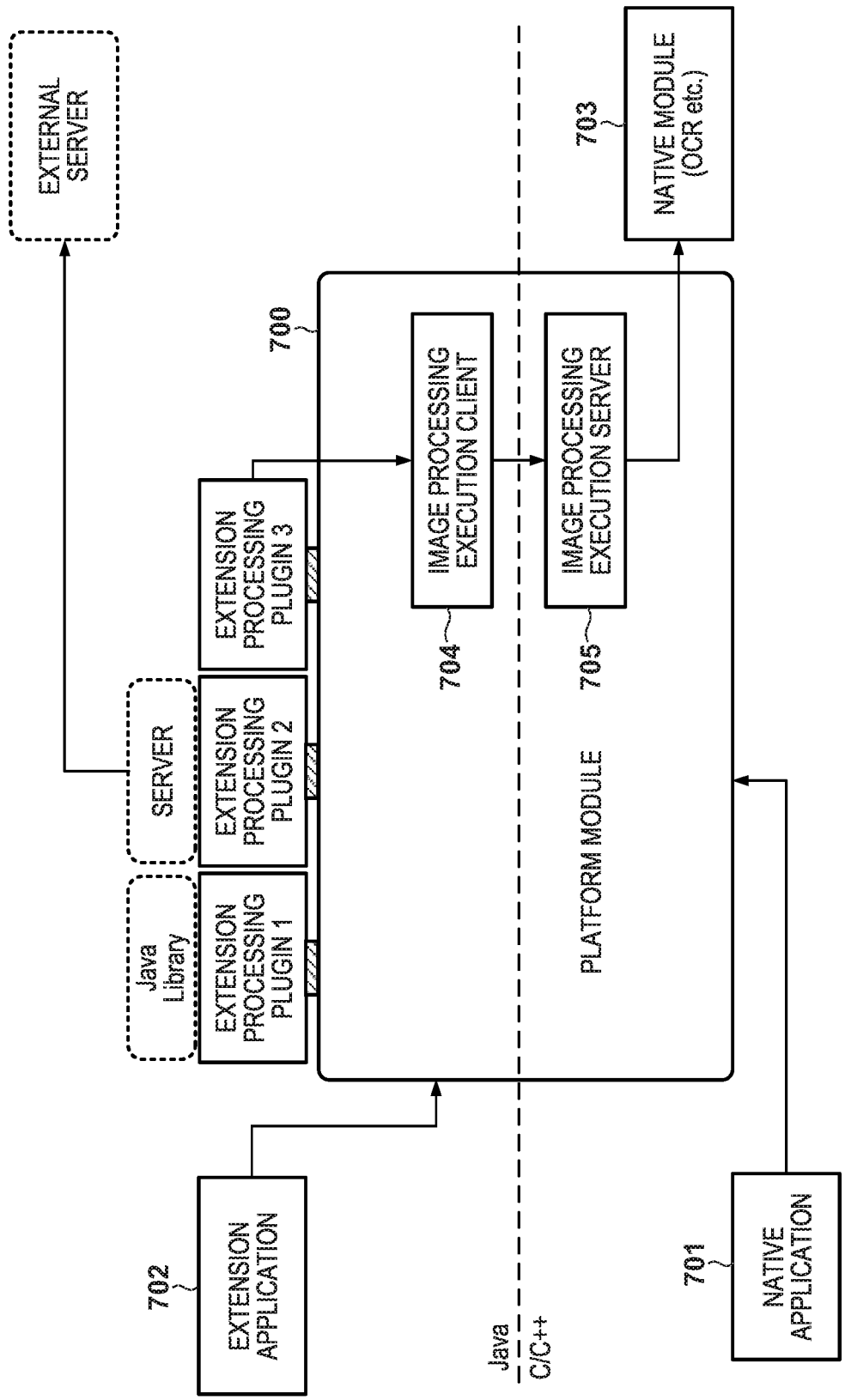
FIG. 7 shows an arrangement example of an image processing system in the image forming apparatus.

Next, the outline of an image processing (information processing) system installed in the image forming apparatus 101 according to this embodiment will be described with reference to FIG. 7. In this embodiment, the image processing system includes a platform module 700, a native application 701, an extension application 702, a native module 703, an image processing execution client 704, an image processing execution server 705, and extension processing plugins 1 to 3.

The native application 701 or the extension application 702 (Java application) can request the platform module 700 to perform execution of desired image processing (information processing) in accordance with a user instruction. The native application 701 is written in a program language such as a C language and is an application originally provided (preinstalled) in the image forming apparatus 101. The native application 701 includes, for example, a print application, a copy application, a scan application, and a transmission application. In order to update the native application 701, the firmware of the image forming apparatus 101 needs to be updated. The extension application 702 is an application written in a program language such as a Java language. The extension application 702 is installed afterward in the image forming apparatus 101 to extend the function of the image forming apparatus 101. For example, the extension application 702 is a login application for managing user login to the image forming apparatus 101.

In the image forming apparatus 101, one or more extension processing plugins can be operated on the platform module 700. In this embodiment, the three extension processing plugins 1 to 3 are operated on the platform module 700. Like the extension application 702, the extension processing plugins 1 to 3 are installed afterward in the image forming apparatus 101 to extend the functions of the image forming apparatus 101. To update the function of the extension processing plugin, the plugin is simply updated, and the firmware of the image forming apparatus 101 need not be updated.

In this embodiment, the extension processing plugin 1 is an extension processing plugin that executes processing by connecting to a library written in the Java language in the image forming apparatus 101. The extension processing plugin 2 is an extension processing plugin that executes processing by connecting to an external server such as a cloud server. The extension processing plugin 3 is an extension processing plugin that executes processing by connecting to the native module 703 written in the C language.

The extension processing plugin 3 connects to the native module 703 via the image processing execution client 704 and the image processing execution server 705. The native module 703 is preinstalled in the image forming apparatus 101 like the native application 701. In order to update the native module 703, the firmware of the image forming apparatus 101 needs to be updated like the native application 701. In this embodiment, the native module 703 is a module which provides OCR processing. Note that the extension processing plugins 1 to 3 are merely examples, and the connection destination and processing contents of the extension processing plugin are not limited to the above connection destinations and processing contents.

The platform module 700 can accept an image processing execution request from the native application 701 or the extension application 702. For example, the platform module 700 accepts, from the scan application, the execution request of the OCR processing for extracting a text image from the scanned image. Upon accepting the image processing execution request, the platform module 700 selects an extension processing plugin for executing image processing in accordance with an execution request out of the extension processing plugins 1 to 3 and instructs the selected extension processing plugin to execute image processing. For example, the platform module 700 decides the extension processing plugin to be used, based on the type and contents (whether promptness is required, the degree of processing load, and the like) of the image processing, the execution of which is requested. The platform module 700 obtains the execution result of the requested image processing from the used extension processing plugin. The platform module 700 outputs the obtained execution result as a response to the execution request to the application of the transmission source of the execution request.

Particularly, this embodiment will describe an arrangement for preventing an error (memory operation error) occurring in one use area from an influence on the other use area, by dividing the use areas of the process and memory between the extension processing plugin 3 and the native module 703.

Each element shown in FIG. 7 has the following correspondence relationship with each element (to be described below) shown in FIG. 3. The platform module 700 corresponds to a connection library 332. The native application 701 corresponds to device control libraries 309. The extension application 702 corresponds to a single function plugin application 302. The extension processing plugins 1 to 3 correspond to an image processing plugin application 303. The native module 703 corresponds to a native module 316. The image processing execution client 704 corresponds to a native client 331. The image processing execution server 705 corresponds to a native server 315.

<Software Arrangement of Image Forming Apparatus>

FIG. 3 is a block diagram showing a software arrangement example of the image forming apparatus 101 according to this embodiment. The software arrangement of the image forming apparatus 101 is implemented by using, for example, the programs stored in the HDD 213. The software arrangement shown in FIG. 3 includes a hierarchical structure formed from a lowermost layer including an operating system 317, an uppermost layer corresponding to a Java® execution environment 330, and an intermediate layer between the lowermost and uppermost layers. This hierarchical structure has a relationship in which excluding some exceptions, a service provided by a lower layer can be used by an upper layer. Note that the exceptions indicate that each device control library 309 can use, via an image processing controller 340, the image processing plugin application 303 included in the uppermost layer, as will be described later.

The lowermost layer is a layer including the operating system 317 to perform program execution management, memory management, and the like. A printer control driver 318, a scanner control driver 319, and a network I/F control driver 320 are embedded in the operating system 317. The printer control driver 318, the scanner control driver 319, and the network I/F control driver 320 can function to cooperate with each other. The printer control driver 318 is software for controlling the printer 202 via the printer I/F 215. The scanner control driver 319 is software for controlling the scanner 203 via the scanner I/F 216. The network I/F control driver 320 is software for controlling the network I/F 214.

The intermediate layer which is higher than the lowermost layer includes the device control libraries 309 and the image processing controller 340. In this embodiment, the programs of the device control libraries 309 and the image processing controller 340 are written in a compiler language such as the C language or C++ language and stored in the HDD 213 in the form of an object file which can be directly executed by the CPU 211.

The uppermost layer is an application layer including an application operated in the Java execution environment 330. The uppermost layer includes plugin applications 301 and device control applications 304 and further includes the native client 331 and the connection library 332. Each application of the uppermost layer is operated using an API (Application Programming Interface) provided by a corresponding one of the device control libraries 309 or the connection library 332, thereby providing various kinds of functions. Note that the functions of the device control applications 304 can be extended by updating the firmware of the image forming apparatus 101.

In this embodiment, the programs of the plugin applications 301 and the device control applications 304 can be written in the Java language and stored in the HDD 213 in a Java byte code format which can be interpreted by a Java virtual machine. For this reason, the CPU 211 executes the program of the Java virtual machine, reads out the program in the Java byte code format from the HDD 213, and causes the Java virtual machine to execute the program, thereby implementing processing by each application of the uppermost layer.

As described above, one of the reasons for using a programming language such as the Java language is ease of writing a program. Since the management of the memory area is automatically performed in the Java, a developer need not manage the memory area. For this reason, the developer's labor at the time of writing a program can be reduced, and it is expected that the developing efficiency can be improved.

(Device Control Libraries 309)

Next, the device control libraries 309 will be described in more detail. The device control libraries 309 are statically or dynamically linked to the single function plugin application 302 or a corresponding one of the device control applications 304 to be described later. Each device control library 309 uses the operating system 317 of the lowermost layer based on an instruction by each application of the uppermost layer. In addition, each device control library 309 can request the execution of the image processing for a native connection library 314. As an example, the device control libraries 309 are formed from a print library 310, a copy library 311, a scan storage library 312, and a scan transmission library 313.

The print library 310 provides an API for controlling a print job using the function of the printer control driver 318. The print job indicates a series of processes of performing printing at the printer 202 based on print data stored in the HDD 213 or print data received from an external device (the information processing terminal 103 or 104, or the like) via the network I/F 214. The copy library 311 provides an API for controlling a copy job using the functions of the scanner control driver 319 and the printer control driver 318. The copy job is a series of processes for scanning an original image at the scanner 203 and printing at the printer 202 based on the obtained image data.

The scan storage library 312 provides an API for controlling a scan storage job using the function of the scanner control driver 319. The scan storage job is a series of processes of performing scanning of the original image at the scanner 203, conversion of the obtained image data into the print data or data in a general format, and storage of data in the HDD 213 or an external storage device such as a USB memory connected to the extension I/F 218. Note that the general format is a data format such as PDF (Portable Document Format) or JPEG (Joint Photographic Experts Group).

The scan transmission library 313 provides an API for controlling a scan transmission job using the functions of the scanner control driver 319 and the network I/F control driver 320. The scan transmission job is a series of processes for performing scanning of the original image at the scanner 203, conversion of the obtained image data into data in a general format, and transmission of the data to an external device via the network I/F 214. In the scan transmission job, the data is transmitted via the network I/F 214 to, for example, the file server such as the server 105 or transmitted to an external device such as the information processing terminal 103 or 104 by email.

(Image Processing Controller 340)

Next, the image processing controller 340 will be described in more detail. The image processing controller 340 includes the native connection library 314, the native server 315, and the native module 316. Upon receiving an image processing execution request from the device control libraries 309, the native connection library 314 transfers the request contents to the connection library 332. Upon receiving a request from the application operating in the Java execution environment 330 (to be described later), the native server 315 provides the function of executing the native module 316. The native module 316 is software capable of executing various kinds of image processing.

The native server 315 and the native module 316 are executed on a native control process 350, as shown in FIG. 3. The native control process 350 is a program execution unit that has a logical memory space separated from a logical memory space of software other than the native server 315 and the native module 316. Note that this memory area separation can also be implemented by another method such as a method using a process mechanism of a general OS (Operating System).

According to this embodiment, as described above, the logical memory space of the native control process 350 is independent of the logical memory space of the other software. For this reason, even if an error occurs in the memory operation on the native control process 350, such an error can be prevented from influencing the logical memory space of the application on the side for requesting the execution of the image processing on the native server 315. That is, the error in the operation of the application on the side for requesting the execution of the image processing on the native server 315 can be prevented.

(Device Control Applications 304)

Next, the device control applications 304 will be described in more detail. As an example, the device control applications 304 include a print application 305, a copy application 306, a scan storage application 307, and a scan transmission application 308. The device control applications 304 are resident applications in the image forming apparatus 101.

The print application 305, the copy application 306, the scan storage application 307, and the scan transmission application 308 have screen information 321, screen information 322, screen information 323, and screen information 324, respectively. The CPU 211 can display the corresponding operation screen on the operation unit 204 via the operation unit I/F 217 based on the screen information 321, the screen information 322, the screen information 323, and the screen information 324. The CPU 211 can accept an instruction from the user via the displayed operation screen.

Upon detecting that the user operates operation unit 204 to change the settings of the device control applications 304, the CPU 211 writes the change contents in the HDD 213. Upon detecting that the user operates the operation unit 204 to request job execution, the CPU 211 (each device control application 304) calls the API of a corresponding one of the device control libraries 309, thereby starting execution of the job. In addition, the CPU 211 (each device control application 304) can request the execution of the image processing to the connection library 332.

For example, the print application 305 calls the API of the print library 310 to execute a print job. The copy application 306 calls the API of the copy library 311 to execute a copy job. The scan storage application 307 calls the API of the scan storage library 312 to execute a scan storage job. The scan transmission application 308 calls the API of the scan transmission library 313 to execute a scan transmission job.

(Plugin Applications 301)

Next, the plugin applications 301 will be described in more detail. Different from the device control applications 304 as the resident applications, the plugin applications 301 are applications which can be installed or uninstalled as a plugin to or from the image forming apparatus 101. The plugin applications 301 are installed in the image forming apparatus 101 by using a remote UI (User Interface) or the like. Note that in the external device such as the information processing terminal 103 or 104, the remote UI is a mechanism for accessing the image forming apparatus 101 from a Web browser and allowing confirmation of a situation of the image forming apparatus 101, an operation of the print job, and various kinds of settings.

The plugin applications 301 include the single function plugin application 302 and the image processing plugin application 303. In the plugin applications 301 (the single function plugin application 302 and the image processing plugin application 303), programs necessary for the respective operations are packaged. The plugin applications 301 can be individually activated or stopped.

A series of operations from installation to the activation, stop and uninstallation of the plugin applications 301 will be described below. Upon detecting the installation of the plugin applications 301 using the remote UI or the like, the CPU 211 stores the information of the plugin applications in the HDD 213. Next, upon detecting the activation instruction to the plugin applications 301, the CPU 211 instructs the activation of the plugin applications. While the plugin applications 301 are activated, the functions of the plugin applications can be provided.

After that, upon detecting a stop instruction to the plugin applications 301, the CPU 211 instructs the stop of the plugin applications 301. In addition, upon detecting an uninstallation instruction to the plugin applications 301, the CPU 211 uninstalls the plugin applications by deleting the information of the plugin applications 301 from the HDD 213. Note that each instruction detected by the CPU 211 can be performed from, for example, the remote UI or the operation unit 204. However, an instruction can be performed by a method other than the above method.

(Single Function Plugin Application 302)

Next, the single function plugin application 302 will be described in more detail. The single function plugin application 302 has screen information 325. Based on the screen information 325, the CPU 211 can display the corresponding operation screen on the operation unit 204 via the operation unit I/F 217. In addition, the CPU 211 can accept an instruction from the user via the displayed operation screen.

The single function plugin application 302 can provide a function or screen different from the device control applications 304 to the user by calling the API provided by the device control libraries 309. The single function plugin application 302 can provide a plurality of functions by the device control libraries 309 in combination. For example, the single function plugin application 302 can provide the function of copying a given image and transmitting image data obtained by scanning to a specific destination in a destination database which holds this plugin application itself.

Note that the single function plugin application 302 need not have the image processing function. In this case, no setting is performed for the image processing. When the device control libraries 309 receive, from the single function plugin application 302, print data or image data converted into a general format, the device control libraries 309 instruct the operating system 317 for control of necessary processing, thereby causing the job to be executed.

(Image Processing Plugin Application 303)

Next, the image processing plugin application 303 will be described in more detail. The image processing plugin application 303 is an application for providing specific image processing. Note that the image processing plugin application 303 may be formed from a plurality of applications for executing different image processing operations. For example, a plurality of applications capable of executing, for example, image format conversion, skew correction, form recognition, and OCR processing of an input image may be installed in the image forming apparatus 101 as the image processing plugin application 303. In this embodiment, three applications corresponding to the extension processing plugins 1 to 3 in FIG. 7 are installed as the image processing plugin application 303.

The image processing plugin application 303 can accept an image processing request (an image processing execution request) from the single function plugin application 302 (the extension application 702) or the device control applications 304 via the connection library 332. In addition, the image processing plugin application 303 can also accept an image processing request from the device control libraries 309 (the native application 701) via the native connection library 314 and the connection library 332.

The image processing plugin application 303 executes image processing in accordance with an accepted image processing request. The image processing request can include image data and processing parameters of a processing target. In addition, the image processing plugin application 303 can use the image processing function of the native client 331 based on the image processing request, as needed. Note that the image processing plugin application 303 itself need not have an image processing function. Even if the image processing plugin application 303 does not have the image processing function, the image processing plugin application 303 can use the image processing function of the native module 316 by using the native client 331. In this embodiment, the image processing plugin application 303 corresponding to the extension processing plugin 3 (FIG. 7) uses the image processing function of the native module 316 (the native module 703) via the native client 331.

One of the reasons for causing the image processing plugin application 303 to use the native module 316 is a higher processing speed in image processing. More specifically, when performing image processing, execution of complicated numerical arithmetic operations in a large amount is required, and a large-capacity memory in the course of processing is required. In such a case, a higher processing speed can be expected by using not a processing system that uses a programming language for performing processing via a virtual machine like Java, but by using a processing system that uses a compiler language for generating an object file that is directly executed by the CPU.

In this manner, the image forming apparatus 101 according to this embodiment includes the native client 331 and the native server 315 as a mechanism for calling a program executed in the C/C++ execution environment from the programs executed in the Java execution environment 330. The native client 331 operates in the Java execution environment 330, and the native server 315 operates in the C/C++ execution environment. Note that the Java execution environment 330 is an example of a first execution environment corresponding to a first programming language (Java language), and the C/C++ execution environment is an example of a second execution environment corresponding to a second programming language (C/C++ language).

In accordance with a request from the image processing plugin application 303 which is executed in the Java execution environment 330, the native client 331 transmits a processing request for requesting the execution of the image processing using the native module 316 which is executed in the C/C++ execution environment. The native server 315 executes the image processing by receiving the processing request transmitted from the native client 331 and executing the native module 316 in accordance with the received processing request. This native server 315 is operated on the native control process 350 that has memory space independent of the memory space used by the Java execution environment 330.

According to this embodiment, as described above, the logical memory space of the native control process 350 is independent of the logical memory space (the logical memory space used in the Java execution environment 330) of other software. For this reason, even if an error occurs in the memory operation on the native control process 350, such an error can be prevented from influencing the logical memory space of the application on the side for requesting execution of the image processing in the native server 315. That is, the error in the operation of the application on the side for requesting the execution of the image processing on the native server 315 can be prevented.

<Processing Procedure by Image Processing Plugin Application>

Figure 4:
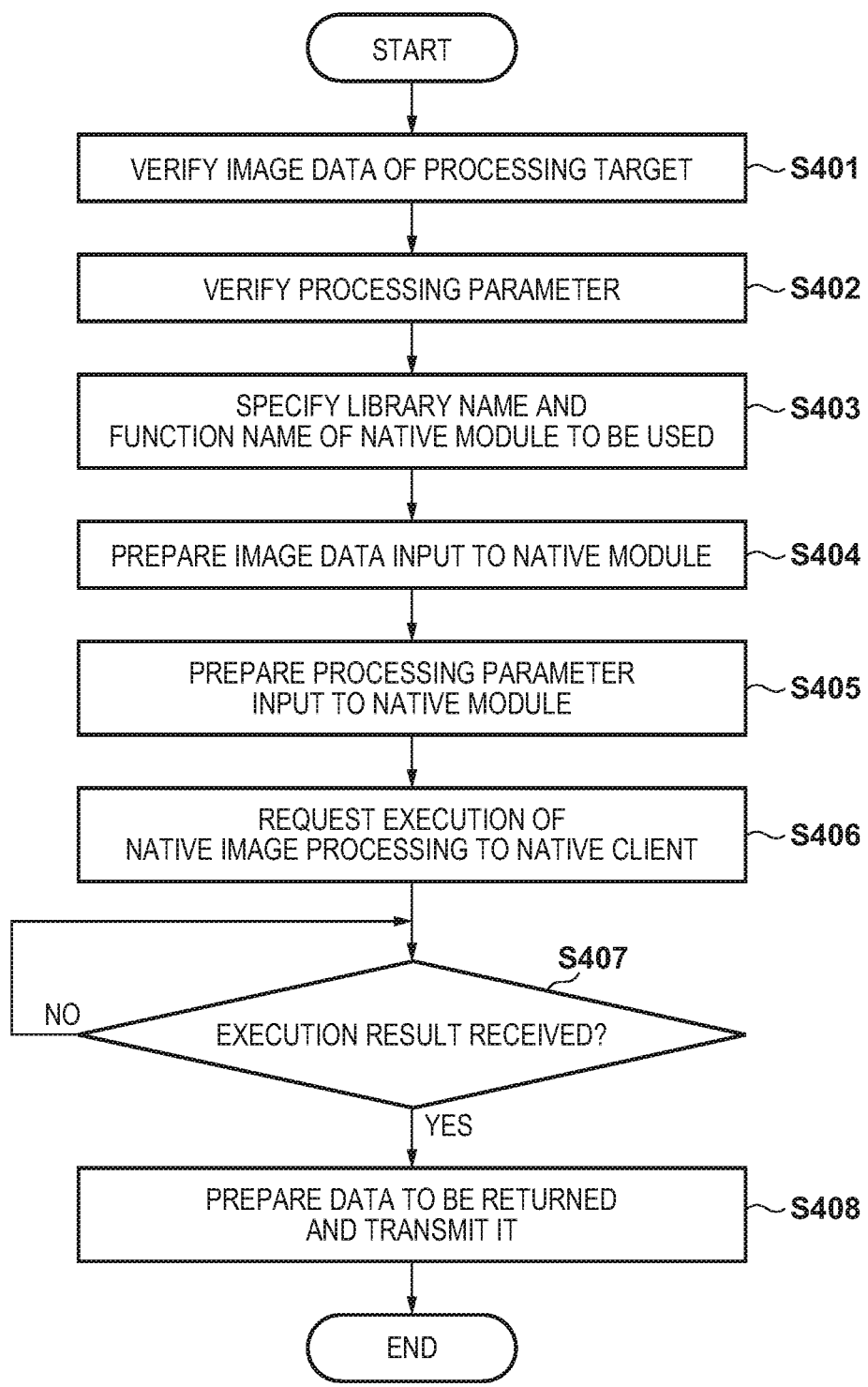
FIG. 4 is a flowchart showing a processing procedure by an image processing plugin application.

FIG. 4 is a flowchart showing the processing procedure by the image processing plugin application 303 according to this embodiment. Processing of the respective steps in FIG. 4 is implemented by the CPU 211 loading programs stored in the HDD 213 into the RAM 212 and executing the programs. This flowchart shows the processing procedure for using the image processing function of the native module 316 in a case where the image processing plugin application 303 accepts the image processing request from the request source. As described above, the request source (transmission source) of the image processing request is either the single function plugin application 302 and the device control applications 304 operating in the Java execution environment 330 or the device control libraries 309 operating in the C/C++ execution environment.

Note that at the time of activation of the image forming apparatus 101, the CPU 211 activates the native client 331 in the Java execution environment 330 and activates the native control process 350 in the C/C++ execution environment. In addition, the CPU 211 activates the native server 315 on the native control process 350. For this reason, when the image processing plugin application 303 accepts the image processing request, the native client 331 and the native server 315 have already been operated, so that a state of use from the image processing plugin application 303 is set.

Upon receiving the image processing request from the request source, the image processing plugin application 303 starts processing in accordance with the procedure shown in FIG. 4. First, in step S401, the image processing plugin application 303 verifies image data serving as the target of image processing (information processing) included in the received image processing request. In this step, for example, the image format and image size of the image data are confirmed. Note that verification may be performed for other items as needed. Next, in step S402, the image processing plugin application 303 verifies the processing parameter concerning the image processing (information processing) included in the received image processing request. In this step, designation of, for example, an OCR language (Japanese, English, or the like) indicated by the processing parameter is confirmed.

Next, in step S403, in accordance with the contents of the image processing requested by the image processing request, the image processing plugin application 303 specifies the library name and function name of the native module 316 to be used. The library name represents the file name of an object file, for example, the file name (a file name having an extension ".so" or ".dll") of a dynamic shared library used in Linux® or Windows. The function name represents the name of a function included in the object file specified by the library name. In this manner, the image processing plugin application 303 specifies a library and a function to be used by the native server 315, based on the image data and processing parameter accepted from the request source of the image processing request.

After the library name and the function name are specified, in step S404 the image processing plugin application 303 prepares the image data input to the native module 316 to be used. In step S405, the processing parameter input to the native module 316 to be used is prepared.

After that, in step S406, the image processing plugin application 303 transmits, to the native client 331, the image processing request that includes the image data and processing parameter respectively prepared in steps S404 and S405. The image processing request includes the library name and function name specified in step S403 as the designation of the library and function used in image processing. Accordingly, the image processing plugin application 303 requests the native client 331 to execute the image processing. Upon accepting this request, the native client 331 sends an image processing request to the native server 315 in accordance with a predetermined method. Note that the native server 315 executes image processing by the procedure (to be described later) shown in FIG. 5, in accordance with the image processing request.

Next, in step S407, the image processing plugin application 303 determines whether or not the image processing execution result is received from the native client 331. If the image processing plugin application 303 receives the execution result of the image processing based on the image processing request from the native server 315 via the native client 331, it advances the process to step S408. Note that as will be described later, if the image processing by the native server 315 that is operating on the native control process 350 is complete, the image processing execution result is transmitted from the native server 315 to the native client 331.

In step S408, the image processing plugin application 303 prepares data representing an image processing execution result to be returned to the image processing request source, transmits it to the request source, and ends processing. Note that the data to be returned changes in accordance with the contents of the requested image processing. For example, if image format conversion is requested, the converted image data is included in the data to be returned. In addition, if form recognition is requested, metadata such as a form type is included in the data to be returned.

<Processing Procedure by Native Server>

Figure 5:
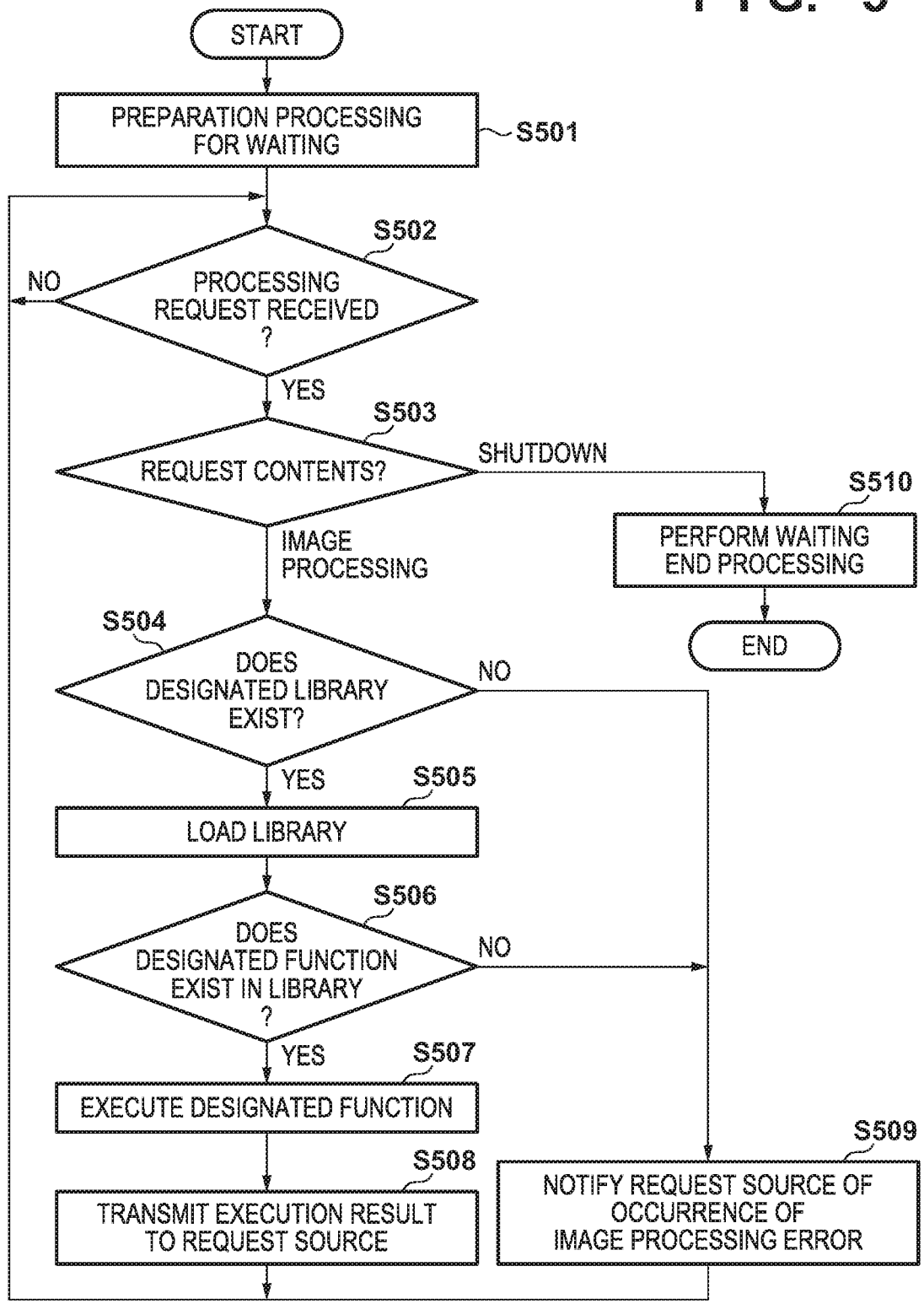
FIG. 5 is a flowchart showing a processing procedure by a native server.

FIG. 5 is a flowchart showing the processing procedure by the native server 315 according to this embodiment. Processing of the respective steps in FIG. 5 is implemented by the CPU 211 loading programs stored in the HDD 213 into the RAM 212 and executing the program.

If the native server 315 is activated, the native server 315 starts processing in accordance with the procedure shown in FIG. 5. First, in step S501, the native server 315 performs preparation processing for waiting for a processing request from the native client 331. In this embodiment, the native server 315 receives the processing request from the native client 331 by TCP/IP communication. For this reason, the native server 315 generates a server socket for TCP/IP communication with the native client 331 and waits for the communication by the generated socket. Note that waiting using an IPC (Interprocess Communication) message queue or the like in place of TCP/IP communication may be performed.

If the preparation processing in step S501 is complete, the native server 315 then waits for a processing request from the native client 331 in step S502. The native server 315 determines whether or not the processing request from the native client 331 is received. If the native server 315 detects the reception of the processing request, it advances the process from step S502 to step S503.

The native server 315 determines in step S503 whether the contents of the received processing request are an image processing request or a shutdown request. If the contents of the processing request are the shutdown request, the native server 315 advances the process from step S503 to step S510 and performs end processing for ending waiting of the processing request, thereby ending the processing. On the other hand, if the contents of the received processing request are an image processing request, the native server 315 advances the process from step S503 to step S504.

The native server 315 determines in step S504 whether or not a library (a library designated in the image processing request) corresponding to a library name included in the received image processing request exists in the native module 316. If no designated library exists, the native server 315 advances the process to step S509, notifies the native client 331 of generation of an image processing error, and returns the process to step S502. After that, the native server 315 waits for a processing request again from the native client 331. On the other hand, if the designated library exists, the native server 315 advances the process to step S505.

In step S505, the native server 315 loads the designated library of the libraries of the native module 316 from the HDD 213 into the RAM 212. After that, the native server 315 determines in step S506 whether or not a function (a function designated in the image processing request) corresponding to a function name included in the received image processing request exists in the library loaded into the RAM 212. If no designated function exists, the native server 315 advances the process to step S509, notifies the native client 331 of the generation of the image processing error, and then returns the process to step S502. After that, the native server 315 waits for a processing request again from the native client 331. On the other hand, if the designated function exists, the native server 315 advances the process to step S507.

In step S507, the native server 315 designates the image data and processing parameter of the processing target in an argument of the designated function, and executes this designated function, thereby executing the image processing in accordance with the image processing request. In addition, if execution of this function is complete, the native server 315 transmits the image processing execution result to the request source (the native client 331) in step S508, and returns the process to step S502. After that, the native server 315 waits for a processing request again from the native client 331.

As has been described above, in this embodiment, the native server 315 operates in the C/C++ execution environment and executes the native module 316 (the second program) in accordance with the processing request from the native client 331, thereby executing the image processing. The native server 315 operates on the native control process 350 that uses the memory space independent of the memory space used in the Java execution environment 330.

According to this embodiment, an error in the memory server caused by the native server 315 on the native control process 350 can be prevented from influencing the operation of the application that is on the side for requesting the native server 315 to execute the image processing. For example, even if an error concerning the memory operation occurs when the native module 316 operates in accordance with a request from the device control applications 304, its influence is limited to the native control process 350. For this reason, even if such an error occurs, the device control applications 304 can prevent the influences on, for example, the transmission destination database held by the RAM 212 and print control by the device control libraries 309. In this manner, the influences of the error in the memory operation in one program on the operation of the other program can be prevented between the programs developed in different programming languages.

Second Embodiment

Next, the second embodiment will now be described. Note that a description of portions common to the first embodiment will be omitted, and points different from the first embodiment will be described below.

In the first embodiment, TCP/IP communication is used in transmission of an image processing request from a native client 331 to a native server 315, and this image processing request includes image data and processing parameters of a processing target. For this reason, as the size of the image data of the processing target increases, the communication time (time required for transfer of the image data) for the image processing request can be prolonged.

For example, it is assumed that the size of the image data of the processing target is 80 MB, the communication transfer throughput is 100 Mbps, and the size of the image data after image processing is equal to the size of the image data of the processing target. In this case, the transfer of the image data between the native client 331 and the native server 315 in an image forming apparatus 101 requires about 0.2 sec. If the image processing is complete in about 0.5 sec, time of about 40% the time required for the image processing is required for the transfer of the image data, and a ratio of the overhead to the entire processing corresponding to the image processing request can be a ratio which cannot be neglected.

In this embodiment, the native client 331 does not transmit, to the native server 315, data obtained by including the image data itself in the image processing request, and the native client 331 transmits data by including information (identification information) capable of specifying the image data in the image processing request. For example, a file path of a HDD 213, like, "/var/docs/01/doc00001.tif", an ID of image data managed by a scan storage library 312, or the like can be used as information capable of specifying the image data. In general, the size of such information is much smaller than the size of the image data. Therefore, by the above processing, the communication time between the native client 331 and the native server 315 can be shortened.

As has been described above, the native client 331 does not include the image data serving as the image processing target in the image processing request but includes in the image processing request and transmits the information for specifying the image data by the native server 315 together with the processing parameter. Accordingly, an image processing plugin application 303 can shorten the processing time for using the image processing function of a native module 316. As a result, the image processing using the native module 316 can be performed at a higher speed.

Third Embodiment

Next, the third embodiment will be described. Note that a description of portions common to the first embodiment will be omitted, and points different from the first embodiment will be described below.

In the first embodiment, upon accepting the image processing request from a native client 331, a native server 315 calls a function corresponding to the requested image processing and returns the function execution result as the image processing execution result. After that, the native server 315 is set in a state of accepting a processing request again. As described above, the native server 315 performs the requested image processing in an order of accepting image processing requests. In this case, if a plurality of image processing requests are generated, the native server 315 cannot start image processing corresponding to the next image processing request until the image processing corresponding to the previously received image processing request is complete.

For example, a user may use an operation unit 204 to operate a copy application 306 while the native server 315 is performing, in accordance with a request from a scan transmission application 308, image processing for generating image data to be transferred to a server 105. In this case, the native server 315 will not start the next image processing (the image processing requested from the copy application 306) until the image processing requested from the scan transmission application 308 is complete. For this reason, the user who uses the copy application 306 must wait, thereby degrading usability for the user.

Accordingly, in this embodiment, in order to perform a plurality of image processing operations corresponding to the plurality of image processing requests in parallel, the native server 315 newly generates a thread for performing image processing every time an image processing request is accepted. This thread is a new thread that uses a memory space of a native control process 350. Then, the native server 315 performs processing for waiting an image processing request and image processing corresponding to the accepted image processing request in parallel.

Figure 6:
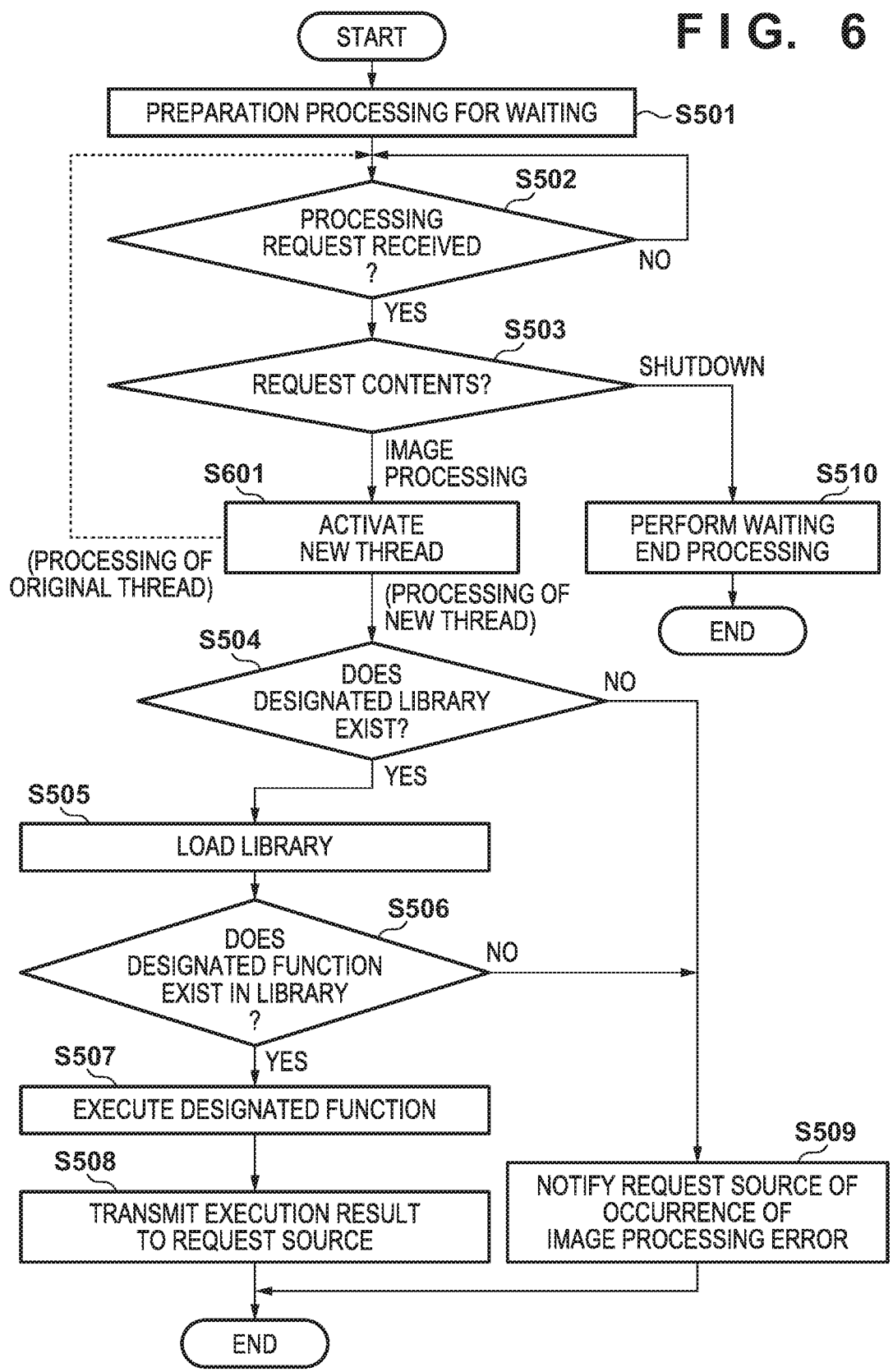
FIG. 6 is a flowchart showing a processing procedure by the native server.

FIG. 6 is a flowchart showing a processing procedure by the native server 315 according to this embodiment. Processing of the respective steps in FIG. 6 is implemented by a CPU 211 loading programs stored in an HDD 213 into a RAM 212 and executing the program.

Steps S501 to S503 are the same as in the first embodiment. Note that in step S503, if the contents of processing request are determined as an image processing request, the native server 315 advances the process to step S601. In step S601, the native server 315 newly generates (activates) a thread for performing image processing corresponding to the received image processing request.

After generating the new thread in step S601, the native server 315 advances processing that uses the new thread to step S504, and at the same time, returns processing that uses the original thread to step S502. Accordingly, the native server 315 executes processing from step S504 using the new thread as in the first embodiment. On the other hand, in parallel with the processing using the new thread, the native server 315 waits (receives) for a new processing request from the native client 331 in step S502 using the original thread as in the first embodiment. Thus, in this embodiment, the new thread is a thread for performing processing from step S504, and the original thread is a thread for waiting a new processing request.

According to this embodiment, even if the native server 315 receives the plurality of image processing requests, the image processing operations corresponding to these requests can be executed in parallel, thereby shortening the processing time. Therefore, the usability can be improved for the user.

Fourth Embodiment

Next, the fourth embodiment will be described. The same parts as in the third embodiment will not be described, and points different from the third embodiment will be described.

In the third embodiment, every time the native server 315 receives an image processing request, a thread for performing image processing is newly generated, and a plurality of image processing requests can be simultaneously accepted. In contrast, in the fourth embodiment, every time the native server 315 accepts an image processing request, the native server 315 generates a new process different from a native control process 350 in place of generating a new thread in step S601. This process uses a memory space independent of the memory space used in the Java execution environment 330 and the memory space used in the native control process 350. In addition, the native server 315 performs processing from step S504 on the generated process.

As described above, according to this embodiment, in the processing in step S601, the native server 315 does not activate a new thread but activate a new process, and performs image processing corresponding to the image processing request in this new process. On the other hand, the native server 315 waits for a new processing request from the native client 331 using the original process in step S502.

According to this embodiment, even between the simultaneously executed image processing operations, the logical memory spaces to be used can be separated from each other. Accordingly, an error in the memory operation in given image processing can be prevented from influencing another image processing. Therefore, the stability of the operation of an image forming apparatus 101 can be further improved.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197058, filed Oct. 10, 2017, which is hereby incorporated by reference herein in its entirety.

What is claimed is:

1. An image forming apparatus for processing a plurality of processing requests in parallel, the image forming apparatus comprising:
   at least one memory storing instructions; and
   at least one processor that, upon execution of the stored instructions, provides a plugin application being a first program executed in a first execution environment corresponding to a first programming language having a function of automatically performing management of a memory area used in the first program;
   a client, wherein the client transmits in accordance with a request received from the plugin application, a plurality of processing requests in parallel for requesting execution of information processing using a second program executed in a second execution environment corresponding to a second programming language having no function of automatically performing management of a memory area used in the second program, the client being operated in the first execution environment; and
   a server, wherein the server receives the plurality of processing requests transmitted from the client and executes the information processing by executing the second program in accordance with the received plurality of processing requests, wherein the server is operated in the second execution environment, wherein the plugin application being the first program executed in the first execution environment uses, via the client being operated in the first execution environment, an information processing function of the second program executed by the server in the second execution environment, by transmitting the request to the client, wherein the server operates on a process that uses a logical memory space independent of a logical memory space used in the first execution environment, wherein upon reception of a new processing request from the client, the server generates a new thread that uses the logical memory space of the process operated by the server in response to determining that the new processing request is an image processing request, wherein in response to the image processing request, determining whether a library and a function in the library exists, and wherein in response to the library and the function in the library not existing, notifying the client of an image processing error, otherwise executing the information processing in accordance with the received new processing request using the new thread at least partially in parallel with the information processing in accordance with a previously received processing request among the plurality of processing requests using a thread other than the new thread, and wherein the information processing in accordance with the received new processing request using the new thread and the information processing in accordance with the previously received processing request using a thread other than the new thread are concurrently processed in the server, and after completion of the processing, the server transmits an execution result of the requested information processing to the client.

2. The apparatus according to claim 1, wherein the processing request includes data serving as a target of the information processing and a parameter concerning the information processing, and includes designation of a library and a function of the second program.

3. The apparatus according to claim 2, wherein the server executes the information processing by designating the data and the parameter in an argument of a function that is designated by the processing request received from the client and that is included in a library designated by the processing request, and executing the function.

4. The apparatus according to claim 1, further comprising an application operated in the first execution environment and corresponding to the first program,
   wherein the application specifies, based on data serving as a target of the information processing and a parameter concerning the information processing, a library and a function to be used by the server, and requests the client to execute information processing using the specified library and the specified function.

5. The apparatus according to claim 4, wherein the application accepts a request that includes data serving as a target of the information processing and a parameter concerning the information processing from another application operated in the first execution environment or another application operated in the second execution environment.

6. The apparatus according to claim 5, wherein if an execution result of the information processing according to the processing request is received from the server via the client, the application transmits data indicating the execution result to the other application.

7. The apparatus according to claim 1, further comprising an activation unit configured to, at the time of activating the information processing apparatus, activate the client in the first execution environment, activate the process in the second execution environment, and activate the server on the process.

8. The apparatus according to claim 1, wherein the client includes information for causing the server to specify data serving as a target of the information processing in the processing request together with a parameter concerning the information processing apparatus without including the data in the processing request, and transmits the processing request to the server.

9. The apparatus according to claim 1, wherein upon reception of a new processing request from the client, the server generates a new process that uses a memory space independent of the memory space used in the first execution environment and independent of the memory space used by an existing process, and executes the information processing in accordance with the received new processing request on the new process.

10. A method of controlling an image forming apparatus for processing a plurality of processing requests in parallel, the method comprising:

operating a client in a first execution environment so as to transmit, in accordance with a request received from a plugin application being a first program executed in the first execution environment corresponding to a first programming language having a function of automatically performing management of a memory area used in the first program, a plurality of processing requests in parallel for requesting execution of information processing using a second program executed in a second execution environment corresponding to a second programming language having no function of automatically performing management of a memory area used in the second program; and operating a server in the second execution environment so as to receive the plurality of processing requests transmitted from the client and execute the information processing by executing the second program in accordance with the plurality of received processing requests, wherein the plugin application being the first program executed in the first execution environment uses, via the client being operated in the first execution environment, an information processing function of the second program executed by the server in the second execution environment, by transmitting the request to the client, wherein the server operates on a process that uses a logical memory space independent of a logical memory space used in the first execution environment, wherein upon reception of a new processing request from the client, the server generates a new thread that uses the logical memory space of the process operated by the server in response to determining that the new processing request is an image processing request, wherein in response to the image processing request, determining whether a library and a function in the library exists, and wherein in response to the library and the function in the library not existing, notifying the client of an image processing error, otherwise, executing the information processing in accordance with the received new processing request using the new thread at least partially in parallel with the information processing in accordance with a previously received processing request among the plurality of processing requests using a thread other than the new thread, and wherein the information processing in accordance with the received new processing request using the new thread and the information processing in accordance with the previously received processing request using a thread other than the new thread are concurrently processed in the server, and after completion of the processing, the server transmits an execution result of the requested information processing to the client.

* * * * *